No. 741,898. PATENTED OCT. 20, 1903.
F. L. FAHRENHOLZ.
VEGETABLE GRATER.
APPLICATION FILED AUG. 30, 1902.
NO MODEL.
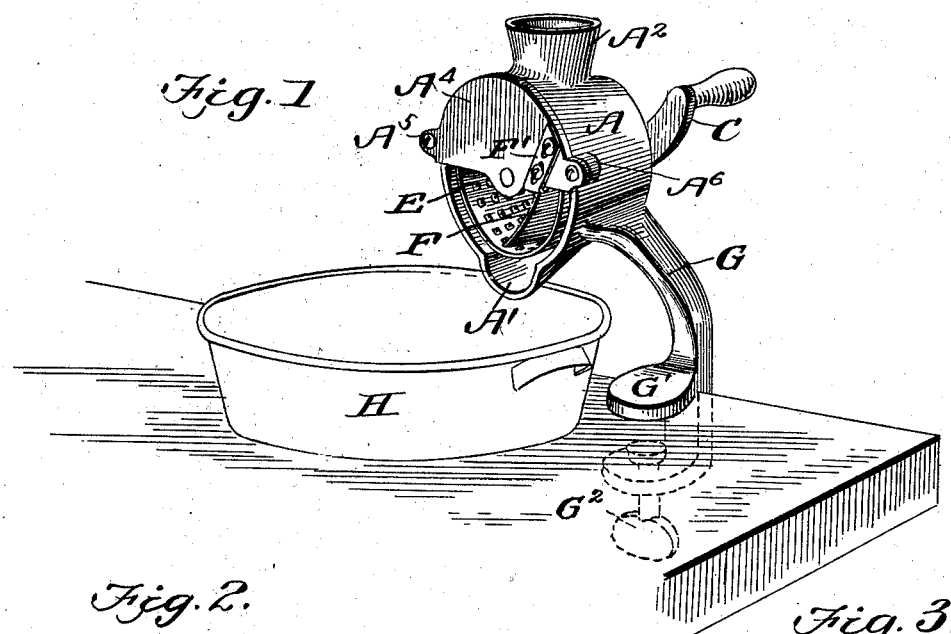
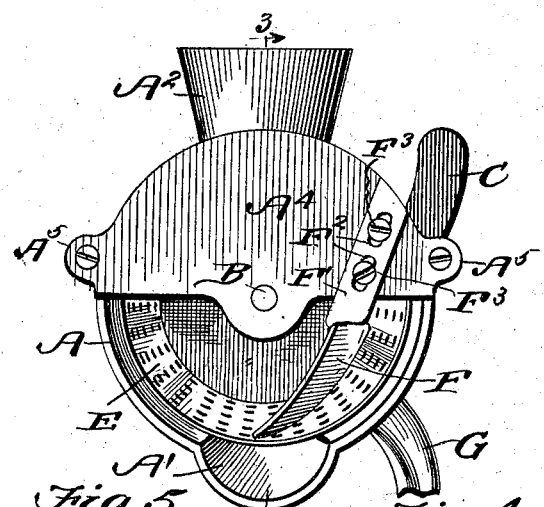
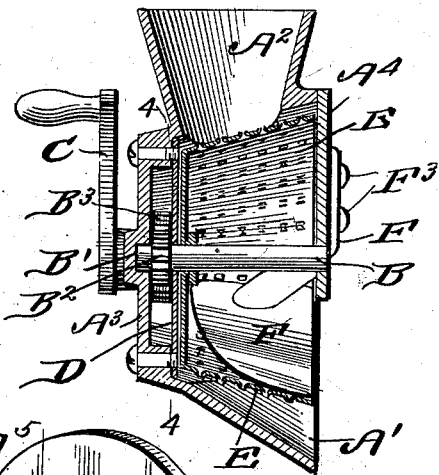
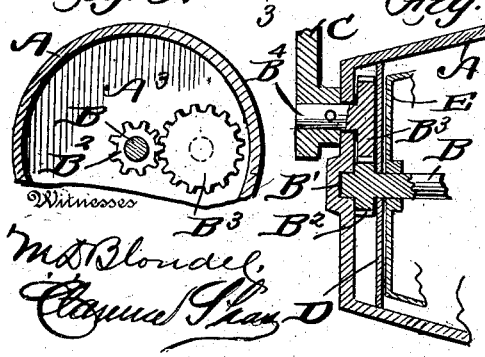
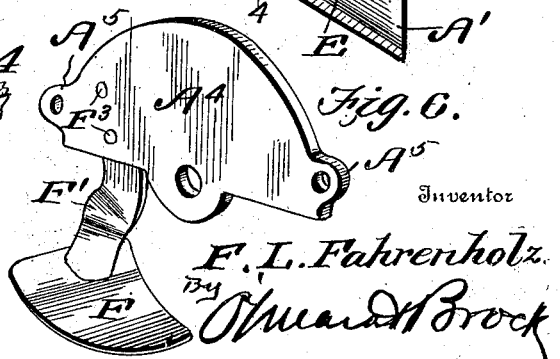
Inventor
F. L. Fahrenholz.
By Howard H. Brock
Attorneys No. 741,898. Patented October 20, 1903.

UNITED STATES PATENT OFFICE.

FREDERICK L. FAHRENHOLZ, OF ST. PAUL, MINNESOTA.

VEGETABLE-GRATER.

SPECIFICATION forming part of Letters Patent No. 741,898, dated October 20, 1903.

Application filed August 30, 1902. Serial No. 121,643. (No model.)

*To all whom it may concern:*

Be it known that I, FREDERICK L. FAHRENHOLZ, a citizen of the United States, residing at St. Paul, in the county of Ramsey and State of Minnesota, have invented a new and useful Vegetable-Grater, of which the following is a specification.

My invention is an improved vegetable-grater; and the object of my device is to provide a grater that will rapidly and evenly reduce vegetables to a pulp of the desired consistency, and this without risk of injuring the hand, as in the grater where the matter to be grated is rubbed by hand on the grating-surface.

Briefly, my invention comprises a substantially cone-shaped casing, carrying a hopper and having a similar-shaped grating-surface revolubly mounted within the casing, the vegetables to be grated passing between the inner wall of the casing and the grater-surface.

In the accompanying drawings, Figure 1 is a perspective view of my device. Fig. 2 is a front view of the device, the supporting-arm being broken off. Fig. 3 is a vertical section about on the line 3 3 of Fig. 2. Fig. 4 is a partial section of Fig. 2 approximately on a horizontal plane passing below $A^5$. Fig. 5 is a detail view showing the gears, and Fig. 6 is a detail perspective view of the front plate and scraper.

In constructing my improved grater I employ a casing A, having the general form of a truncated-cone section having a lip $A'$ formed on its lower side, while a hopper $A^2$, communicating with the interior of the casing, is mounted on the upper side of same and is shown as being integral therewith. The casing is permanently inclosed at the back, and the back $A^3$ is shown as being integral with the sides of the casing, though this construction is not essential. The other end of the casing is covered over its upper half by a front plate $A^4$, having perforated lugs $A^5$ formed on it, by means of which it is secured to the casing, the side lugs corresponding to similar lugs formed on the casing, as shown at $A^6$, Fig. 1, while the central dependent lug serves as a journal-bearing for the shaft B, which shaft is journaled at its rear end in a socket $B'$, formed in the back of the casing. This shaft carries adjacent its rear end a small gear $B^2$, meshing with a larger gear $B^3$, mounted on a stub-shaft $B^4$, this last shaft projecting through the rear of the casing and carrying a handle C. To prevent juice from the vegetables grated reaching the gears, a partition D is rigidly secured, by means of suitable screws, to the back plate, thus forming a narrow transverse chamber in the rear portion of the casing.

Rigidly mounted on the shaft B in advance of the partition is the truncated-cone section E, adapted to revolve within the casing and of such size as to leave a small space between the sides of the casing and inner cone-section. The part E has a solid back, is open in front, and its sides have perforations punched therein from within, giving its outer face the usual grating construction.

A scraper F, consisting of a piece of curved metal tapering to a point and resembling in outline a plowshare is secured, by means of a twisted arm $F'$, to the front plate of the casing. This arm has slots $F^2$ formed in it, through which pass the binding-screws $F^3$. The scraper projects into the grater and may be adjusted by loosening the screws and raising or lowering the arm $F'$.

Projecting from one side of the casing and extending downwardly is the supporting-arm G, its lower end being bent forwardly and perforated, while a forwardly-projecting shoulder is formed at $G'$ above the bent end. The end is perforated, and a clamping-screw $G^2$ works in same. This construction is shown in dotted lines in Fig. 1, and being a well-known mode of clamping articles to tables and benches no detail description is thought necessary.

In operating, the vegetables are dropped into the hopper and fall upon the grating-surface of the inner cone-section. By turning the handle motion will be imparted to the shaft B through the gears $B^3$ $B^2$, and the grating-section will rotate with the shaft, forcing the vegetables downward between its serrated surface and the casing, the grated matter escaping through the lip $A'$ into a pan H or other receptacle. Such of the pulp as may pass through the perforations into the inner section is forced out again by the scraper.

It is obvious that minor changes may be made in my device without departing from the spirit of my invention.

Having thus fully described my invention, what I claim as new, and desire to secure by Letters Patent of the United States, is—

A vegetable-grater comprising a conical casing, horizontally mounted, forwardly open, and having a downwardly and forwardly extending lip on its lower side, a detachable front plate secured to the casing, a revoluble shaft journaled in the rear end of the casing, a gear rigidly secured to said shaft within the casing, means for imparting motion to said gear, a grating-cone rigidly mounted on said shaft, a hopper mounted above the casing and adapted to discharge upon the upper rear portion of the grating-cone, a vertical partition between the gear and the cone, a twisted arm secured to the front plate, and a scraping-blade secured to said arm and arranged within the grating-cone above the lip.

FREDERICK L. FAHRENHOLZ.

Witnesses:
HARRY A. LUND,
EUGENE N. LUND.